United States Patent
Dev et al.

(10) Patent No.: US 12,033,218 B2
(45) Date of Patent: Jul. 9, 2024

(54) ASSESSING DAMAGES ON VEHICLES

(71) Applicant: Vehicle Service Group, LLC, Madison, IN (US)

(72) Inventors: Bodhayan Dev, Sturbridge, MA (US); Sreedhar Patnala, Holliston, MA (US); Michael Johannes, Danvers, MA (US); Prem Swaroop, Lexington, MA (US)

(73) Assignee: Vehicle Service Group, LLC, Madison, IN (US)

( * ) Notice: Subject to any disclaimer, the term of this patent is extended or adjusted under 35 U.S.C. 154(b) by 335 days.

(21) Appl. No.: 17/589,453

(22) Filed: Jan. 31, 2022

(65) Prior Publication Data

US 2023/0245240 A1     Aug. 3, 2023

(51) Int. Cl.
| | |
|---|---|
| *G06K 9/00* | (2022.01) |
| *G06Q 40/08* | (2012.01) |
| *G06V 10/20* | (2022.01) |
| *G06V 10/22* | (2022.01) |
| *G06V 10/70* | (2022.01) |

(52) U.S. Cl.
CPC ........... *G06Q 40/08* (2013.01); *G06V 10/225* (2022.01); *G06V 10/255* (2022.01); *G06V 10/70* (2022.01)

(58) Field of Classification Search
None
See application file for complete search history.

(56) References Cited

U.S. PATENT DOCUMENTS

| | | | |
|---|---|---|---|
| 7,331,133 | B2 | 2/2008 | Bauernfeind |
| 10,521,952 | B2 | 12/2019 | Ackerson et al. |
| 11,423,488 | B1 | 8/2022 | Harvey |
| 11,574,395 | B2 * | 2/2023 | Dev .............. G06T 7/0004 |
| 2017/0147990 | A1 | 5/2017 | Franke et al. |
| 2017/0148102 | A1 | 5/2017 | Franke et al. |
| 2017/0352104 | A1 | 12/2017 | Hanson et al. |

(Continued)

FOREIGN PATENT DOCUMENTS

| | | |
|---|---|---|
| KR | 102148884 | 8/2020 |
| WO | WO 2018039560 | 3/2018 |

OTHER PUBLICATIONS

Extended European Search Report in European Appln. No. 23153822.4, dated Jul. 7, 2023, 8 pages.

(Continued)

*Primary Examiner* — SJ Park
(74) *Attorney, Agent, or Firm* — Fish & Richardson P.C.

(57) ABSTRACT

Methods, devices, apparatus, systems and computer-readable storage media for assessing damages on vehicles are provided. In one aspect, a method includes: accessing an image of a vehicle showing shapes each indicating at least one damage area on the vehicle; providing the image as input to a first model to identify the shapes in the image and obtaining shape data describing a position of each shape identified in the image; providing the image as input to a second model to identify one or more panels of the vehicle and obtaining panel data describing a position of each panel identified in the image; automatically correlating the one or more shapes and the one or more panels based on the shape data and the panel data to determine a number of shapes present on each panel; and generating a damage assessment report describing the number of shapes present on each panel.

25 Claims, 10 Drawing Sheets

(56) References Cited

U.S. PATENT DOCUMENTS

| | | | |
|---|---|---|---|
| 2018/0039846 A1 | 2/2018 | Grubb et al. | |
| 2018/0260793 A1 | 9/2018 | Li et al. | |
| 2020/0104940 A1 | 4/2020 | Krishnan et al. | |
| 2021/0103817 A1* | 4/2021 | Gastineau | G06Q 10/20 |
| 2021/0182713 A1 | 6/2021 | Kar et al. | |
| 2021/0287050 A1 | 9/2021 | Kar et al. | |
| 2022/0005121 A1 | 1/2022 | Hayward | |
| 2022/0148050 A1* | 5/2022 | Gandhi | G06Q 10/20 |
| 2022/0164942 A1 | 5/2022 | Dev et al. | |
| 2023/0153975 A1* | 5/2023 | Lutich | G06T 7/10 |
| | | | 382/141 |

OTHER PUBLICATIONS

Alliedvision.com [Online], "Hail Damage: high-resolution cameras detect every dent," Sep. 13, 2016, retrieved on Mar. 24, 2021, retrieved from URL <https://www.alliedvision.com/en/news/detail/news/hail-damage-high-resolution-cameras-detect-every-dent.html>, 2 pages.

Chávez-Aragón et al., "Vision-Based Detection and Labelling of Multiple Vehicle Parts," 2011 14th International IEEE Conference on Intelligent Transportation Systems, Washington, DC, USA, Oct. 5-7, 2011, pp. 1273-1278.

Extended European Search Report in European Appln. No. 21208984.1, dated Apr. 29, 2022, 12 pages.

GadgEon.com [online], "Deep Learning Model to Classify Hail Damage Claims," Jun. 22, 2020, retrieved on Jul. 29, 2022, retrieved from URL <https://www.gadgeon.com/web/images/story/doc/2731_deep-learning-model-to-classify-hail-damage-claims_success_story.pdf>, 10 pages.

Nanonets.com [online], "Vehicle Damage Assessment," available on or before Jan. 17, 2021, via Internet Archive: Wayback Machine URL<http://web.archive.org/web/20210117112731if_/https://nanonets.com/model/vehicle-damage>, retrieved on Mar. 24, 2021, URL<https://nanonets.com/model/vehicle-damage>, 7 pages.

Tian et al., "Deep learning on image denoising: An overview," Neural Networks, 2020, 131:251-275.

* cited by examiner

| Panel | Circle | Dot | Rectangle | # Dents | Repair Cost ($) |
|---|---|---|---|---|---|
| Bedliner | 0 | 11 | 2 | 13 | $2,500 |
| Fender | 0 | 4 | 3 | 7 | $1,250 |
| Front door | 3 | 11 | 0 | 14 | $3,700 |
| Rail | 0 | 9 | 0 | 9 | $1,800 |
| Rear door | 3 | 23 | 1 | 27 | $6,250 |

FIG. 2D

ASSESSING DAMAGES ON VEHICLES

BACKGROUND

Repairing damage to bodywork is a common task undertaken by repair shops and garages world-wide. In the midwestern United States alone, approximately 20,000 insurance claims relating to hail damage are filed every year. Repair shops therefore need to assess damages associated with hail storms and other body-work damages in an efficient manner. Roughly, 30% to 40% of catastrophic sites (hail-impacted sites) are estimated to be remote, where bulky and expensive cameras or scanners are unavailable. Also, damage counts per panel of vehicles are normally obtained manually to generate repair estimates, which is time consuming, labor tedious, and unreliable with low accuracy.

SUMMARY

The present disclosure describes methods, systems and techniques for assessing damages (e.g., hail dents) on vehicles, particularly by detecting specific shapes mapped with damages on vehicle panels.

One aspect of the present disclosure features a computer-implemented method for assessing damages on a vehicle, the method including: accessing an image of at least one section of the vehicle, the image showing a plurality of shapes that each have been applied to indicate at least one damage area present in the at least one section of the vehicle; providing the image as input to a first model that has been trained, through a first machine learning algorithm, to identify the plurality of shapes in the image and, in response, obtaining shape data that is generated by the first model, the shape data describing a position of each of one or more shapes identified in the image; providing the image as input to a second model that has been trained, through a second machine learning algorithm, to identify one or more panels of the vehicle that are present in the at least one section shown in the image, and in response, obtaining panel data that is generated by the second model, the panel data describing a position of each of the one or more panels identified in the image; automatically correlating the one or more shapes and the one or more panels based on the shape data with the panel data to determine, for each of the one or more panels of the vehicle, a number of shapes that are present on the panel; and generating a damage assessment report that describes, for each of the one or more panels of the vehicle, the number of shapes that are present on the panel.

In some embodiments, the first model includes at least one of: You Only Look Once (YOLO), single-shot detector (SSD), or Faster Region-based Convolutional Neural Network (Faster R-CNN).

In some embodiments, the plurality of shapes have at least two different shape types, each of the different shape types corresponding to a different damage category, and the shape data includes a corresponding shape type for each of the one or more shapes identified in the image.

In some embodiments, the computer-implemented method includes: for each of the one or more panels, classifying one or more identified shapes correlated with the panel according to one or more corresponding shape types for the one or more identified shapes; and for each of the one or more corresponding shape types, counting a respective number of identified shapes that are correlated with the panel and have a same corresponding shape type.

In some embodiments, generating the damage assessment report includes: generating shape-damage correlation data based on the one or more panels, the one or more corresponding shape types for each of the one or more panels, and the respective number for each of the one or more corresponding shape types.

In some embodiments, generating the damage assessment report includes: accessing estimate cost data for damage repair that is associated with at least one of damage categories, a number of damage areas in a same damage category, different panels, or vehicle models; and generating the damage assessment report based on the shape-damage correlation data and the estimated cost data for damage repair.

In some embodiments, the computer-implemented method includes: providing the damage assessment report to at least one of a repair shop representative or a vehicle insurance company representative.

In some embodiments, the shape data includes: for each of the one or more shapes, a corresponding label for the corresponding shape type of the shape. The computer-implemented method can include: for each of the one or more panels, counting, based on the corresponding labels, a number of identified shapes that are correlated with the panel and have a same corresponding shape type.

In some embodiments, the first model is trained to process the image to enclose a corresponding bounding box for each of the one or more shapes identified in the image and to determine the position of the shape based on a position of the corresponding bounding box. Automatically correlating the one or more shapes and the one or more panels based on the shape data with the panel data can include: correlating each of the one or more shapes with a respective panel of the one or more panels based on the position of the shape and the position of the respective panel.

In some embodiments, the second model is trained to process the image to segment the at least one section of the vehicle into the one or more panels by masking one or more segments of the image and isolating the masked one or more segments of the image as the one or more panels, each of the masked one or more segments being associated with a corresponding one of the one or more panels.

In some embodiments, automatically correlating the one or more shapes and the one or more panels based on the shape data with the panel data includes: correlating each of the one or more shapes with a respective panel of the one or more panels based on the position of the shape and a masked segment associated with the respective panel.

In some embodiments, the second model includes at least one of: masked R-CNN, thresholding segmentation, edge-Based segmentation, region-based segmentation, watershed segmentation, or clustering-based segmentation.

In some embodiments, the computer-implemented method includes: receiving the image from a remote communication device configured to capture images of the vehicle.

In some embodiments, the computer-implemented method includes: providing an initial image as input to a third model that has been trained, through a third machine learning algorithm, to reduce surface glare of the vehicle in the image and, in response, obtaining the image that is generated by the third model.

In some embodiments, the computer-implemented method includes: generating the image based on multiple sectional images of the vehicle, each of the multiple sectional images being associated with a different corresponding section of the vehicle.

In some embodiments, the computer-implemented method includes: generating the image based on at least one frame of a video stream for the at least one section of the vehicle.

In some embodiments, the computer-implemented method includes: displaying an instruction on a display for capturing a sectional image of a section of the vehicle; and in response to obtaining a captured sectional image of the section of the vehicle, determining whether the captured sectional image reaches an image criteria for the section of the vehicle.

In some embodiments, determining whether the captured sectional image reaches the image criteria for the section of the vehicle includes: processing the captured sectional image to detect information of glare or bright spot on the section of the vehicle; and determining whether the detected information of glare or bright spot is below a predetermined threshold.

In some embodiments, the computer-implemented method includes one of: in response to determining that the captured sectional image fails to reach the image criteria for the section of the vehicle, displaying an indication on the display for retaking the sectional image of the section of the vehicle, or in response to determining that the captured sectional image reaches the image criteria for the section of the vehicle, storing the captured sectional image for processing.

In some embodiments, the computer-implemented method includes: displaying a highlighted view of a representation of the section of the vehicle on the display.

In some embodiments, the computer-implemented method includes: displaying the representation of the section of the vehicle based on information of the vehicle.

In some embodiments, the plurality of shapes are marked on the vehicle by a user, and each of the plurality of shapes at least partially covers a different corresponding damage area in the at least one section of the vehicle.

In some embodiments, the computer-implemented method includes: processing the image by at least one of a glare reduction model, a shape detection model, or a panel detection model that is integrated in a mobile device.

Implementations of the above techniques include methods, systems, computer program products and computer-readable media. In one example, a method can be performed one or more processors and the method can include the above-described actions performed by the one or more processors. In another example, one such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above-described actions.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIG. 2D shows an example of a damage assessment report describing damage areas on the vehicle of FIG. 2A with associated repair costs.

Like reference numbers and designations in the various drawings indicate like elements.

DETAILED DESCRIPTION

Figure 1:
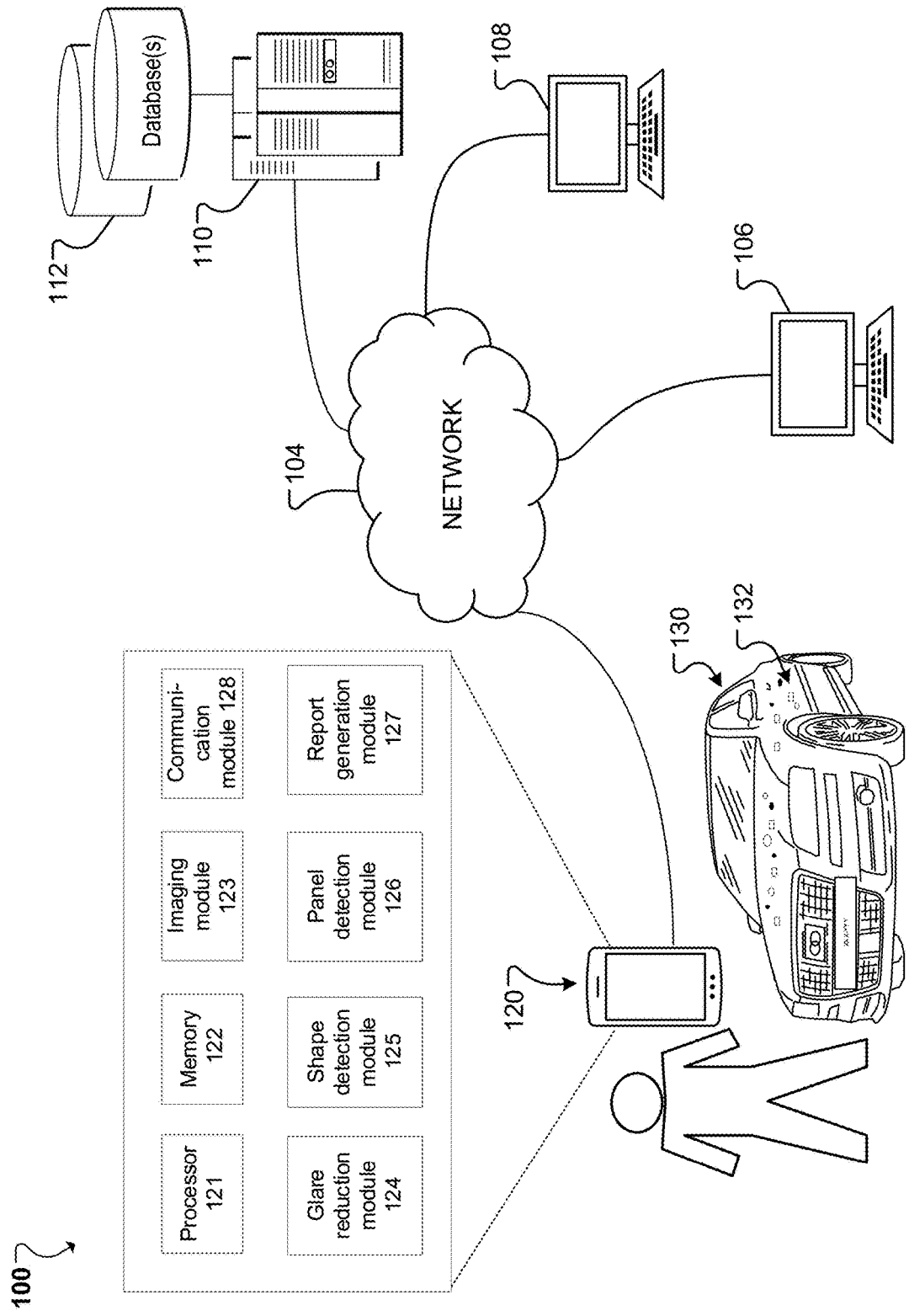
FIG. 1 is a schematic diagram of an example environment for assessing damages on vehicles.

Damages on vehicles include major damages (e.g., crash damages) and minor damages (e.g., hail dents due to hail storms). A minor damage area is an area in which a surface profile of a vehicle has been deformed (e.g., plastically) from its original profile when the vehicle was first assembled. The minor damage area can be an area surrounded by non-damaged surface(s). The minor damage area can be less than about an inch across. In general, the term "damage area" in the present disclosure refers to a minor damage area, such as hail dents.

Current damage detection techniques rely on a combination of classical computer vision techniques, which often requires bulky and expensive camera or scanning rigs. For example, a hybrid three-dimensional (3D) optical scanning system can combine methodologies of active stereo 3D reconstruction and deflectometry to provide accurate 3D surface measurements of an object under inspection. However, such techniques normally require a relatively long inspection time and are limited in their abilities to detect all damages on a portion of a vehicle, especially at edges of panels. As the accuracy is not sufficiently reliable, manual verification may be required, which further increases the time required to complete an inspection. Thus, there is a need for automated damage detection that is faster and more accurate than current techniques.

A constellation scanner can use stereo-pair imaging techniques in conjunction with advanced deep-learning models to estimate hail dent counts per panel and to finally generate an insurance claim-estimate report. However, the constellation scanner is a complicated and expensive instrument, which may not be accessible to remote locations. In the remote locations, paintless dent repair (PDR) technicians usually mark (e.g., scribe or draw) specific shapes on each vehicle panel to detect dents manually under hail lighting conditions. These dent counts per panel are entered manually to generate repair estimates, which is time consuming, labor tedious, and unreliable with low accuracy.

Implementations of the present disclosure provide methods and techniques for automatically assessing damages (e.g., impacted by hailstorms) on vehicles (e.g., in remote locations) with high efficiency, low cost, high accuracy, and convenience. The techniques can detect shapes marked on damage areas on vehicle panels by processing, with one or more machine learning models, vehicle images, e.g., by a mobile device used by a user (e.g., a PDR technician) and/or by a remote cloud server. For example, the techniques provide an ensemble deep-learning framework to remove (or reduce) glare using computer vision techniques, detect/ classify shape-dent relations, and provide automatic labeling or segmentation of vehicle panels. Outputs from the models can be used to generate accurate damage assessment and/or repair or insurance estimates. In such a way, the techniques can be used to automatically obtain an accurate damage assessment report (or an insurance claims report) in a fast, cheap, convenient, and reliable manner.

In some implementations, after the user marks (e.g., scribes or draws) specific shapes on each vehicle panel to indicate damage areas (e.g., hail dents) under hail lighting conditions, the user can use a mobile application deployed in the mobile device to capture an image of at least one section of the vehicle. The mobile application can be configured to instruct the user to sequentially capture a sectional image for each panel or section of the vehicle. Two or more sectional images can be stitched together to get an image to be processed. Then, a to-be-processed image can be fed to a first deep-learning model trained to remove glare or bright spots present on the image. Output from the first deep-learning model can be then fed to a second deep-learning model trained to identify each shape shown on the image and to a third deep-learning model trained to identify each vehicle panel on the image. The models can be executed in the mobile device and/or a remote server in communication with the mobile device. Finally, the model outputs, e.g., the identified shapes and the identified panels, can be processed (e.g., correlated) to generate a count of number of shapes per panel, also referred to as a shape-count. Each shape can be defined to be associated with one or more specific dent categories that can be associated with fixed repair costs. Once the shape-counts per panel are output from the models, the mobile application or the remote server can be configured to generate, or communicate with a third party estimation application to generate, a final damage assessment report and/or insurance repair claim report for an insurance company and/or a repair shop to review. The techniques provide an efficient and accurate way to generate the damage assessment report. The mobile application can be configured to run on mobile devices with minimum latency and compute resources.

The techniques described in the present disclosure produce several technical effects and/or advantages. In some embodiments, compared to purely manual count of dents in vehicles, the techniques can automatically detect shapes in different panels using a machine learning trained model, which are more accurate, fast, reliable, and with less labor, particularly when there are large numbers of dents (e.g., 100s or 1000s) and it would be impossible for a manual count to be accurate. The machine learning trained model can also provide a more accurate count of different shape types, since a user may not be able to accurately tell one shape from another by just looking at it. Accordingly, the final cost estimate can also be more accurate using the techniques.

In some embodiments, compared to classical detection equipment such as 3D cameras or scanning rigs, the techniques provide a more convenient, realistic, and accurate solution. The classical detection equipment is normally large and difficult to position to capture all angles of the vehicle, especially at edges of panels. Accordingly, the accuracy is not sufficiently reliable. Moreover, the large equipment would not be accessible to vehicles at remote locations, which occurs quite frequently. In comparison, the techniques here enable to use a portable or mobile device. The easy mobility and portability of a mobile device such as a smartphone or tablet provides an important advantage over the larger rigs. Moreover, by integrating compatible machine learning models into the mobile device or wirelessly communicating to a cloud server by the mobile device, the mobile device can provide an efficient and accurate way for counting and cost estimation.

FIG. 1 is a schematic diagram of an example environment 100 for implementing damage assessment for vehicles. The environment 100 enables users (e.g., PDR technicians) to assess damages on vehicles in locations, e.g., remotely from repair shops, and to generate damage assessment reports for repair estimates or insurance claims in a simple, fast, and accurate way.

In some embodiments, the environment 100 involves a portable computing device 120 associated with a user, a network 104, a computing device 106 associated with a business entity (e.g., an insurance company), a computing device 108 associated with a vehicle repair shop, and a service computing system 110 (e.g., a cloud computing platform) and one or more databases 112 that can be associated with a service provider. The computing devices and systems 106, 108, 110, 120 can communicate with each other over the network 104. Other embodiments are also possible, including embodiments with more or fewer parties. For example, the environment 100 can include one or more users with associated computing devices, one or more insurance companies with associated computing devices, and one or more repair shops with associated computing devices.

The user can be an inspector for inspecting or checking damages on vehicles. The user can be a PDR technician or any other bodywork technician. The user can be a representative of the vehicle repair shop or a representative of the insurance company. The user can be assigned to assess damages on a vehicle 130, e.g., due to hail storm conditions. The vehicle 130 can be any suitable type of vehicle, e.g., sedan, SUV, car, or truck. The vehicle 130 can be damaged at a remote location away from the vehicle repair shop or any other inspection or scanner systems.

The user can carry a user-side computing device 120 to inspect the vehicle 130. The user can mark (e.g., scribe or draw) specific shapes 132 on vehicle panels for damage areas (e.g., hail dents) under hail lighting conditions. The shapes 132 can be pre-defined by the user or rules to represent different damage categories. For example, the shapes 132 can include solid dots, circles, or rectangles. The damage categories can include small dents (like dime, nickel, or half dollar sized dents), over-sized dents, and prior damage or non-hail dents. In some embodiments, solid dots are used to indicate small dents, circles are used to indicate over-sized dents, and rectangles are used to indicate prior damages or non-hail dents.

The computing device 120 can include any appropriate type of device such as a tablet computing device, a camera, a handheld computer, a portable device, a mobile device, a personal digital assistant (PDA), a cellular telephone, a network appliance, a smart mobile phone, an enhanced general packet radio service (EGPRS) mobile phone, or any appropriate combination of any two or more of these data processing devices or other data processing devices. For illustration purposes only, the computing device 120 is illustrated as a mobile device 120 (e.g., a smart mobile phone or a tablet device).

As discussed with further details in FIGS. 2A-2D and 3A-3H, the mobile device 120 can be configured to capture images and/or process images and/or data. As illustrated in FIG. 1, the mobile device 120 can include at least one processor 121 configured to execute instructions, at least one memory 122 configured to store data, and an imaging module 123 configured to capture images and/or videos. The mobile device 120 can include one or more cameras, e.g., one or more consumer grade cameras like smartphone cameras or DSLR cameras, one or more specialist or high resolution cameras, e.g., active or passive stereo vision cameras, Gigapixel monocular or single vision cameras etc., or a combination of specialist and consumer grade cameras. In some embodiments, one or more cameras are external to the mobile device 120 and can be used to capture the images and transmit the images to the mobile device 120 or the service computing system 110.

The mobile device 120 can include a communication module 128 configured to communicate with any other computing devices. The mobile device 120 may communicate via a wireless network, e.g. cellular network, wireless, Bluetooth, NFC or other standard wireless network protocol. The mobile device 120 may alternatively or additionally be enabled to communicate via a wired network, e.g. via a computer network cable (e.g. CAT 5, 6 etc.), USB cable. For example, the mobile device 120 can communicate with other computing devices or systems through the network 104. The network 104 can include a large computer network, such as a local area network (LAN), a wide area network (WAN), the Internet, a cellular network, or a combination thereof connecting any number of mobile computing devices, fixed computing devices and server systems.

The mobile device 120 can install or integrate a mobile application, e.g., as illustrated with further details in FIGS. 3A-3H. The mobile application can be configured to instruct the user to capture, e.g., sequentially, sectional images of a vehicle, e.g., using the imaging module 123.

In some embodiments, the mobile device 120 transmits images of vehicles to the service computing system 110 through the network 104. In some examples, the system 110 can operate to provide image processing services to computing devices associated with customers, such as the computing devices 106 and 108 for vehicle repair shops or insurance companies. The service computing system 110 can process images to assess damages on vehicles. The service computing system 110 can include one or more computing devices and one or more machine-readable repositories, or databases. In some embodiments, the service computing system 110 can be a cloud computing platform that includes one or more server computers in a local or distributed network each having one or more processing cores. The service computing system 110 can be implemented in a parallel processing or peer-to-peer infrastructure or on a single device with one or more processors.

The service computing system 110 can process images using one or more models including a glare reduction model, a shape detection model, and a panel detection model, as discussed with further details in FIGS. 2A-2D. The glare reduction model can be configured to remove or reduce any glare or bright spots on images, e.g., using mask based techniques including global binarization with Gaussian Blurr-Dilation-Erosion, in painting, or contrast limited adaptive histogram equalization (CLAHE). The shape detection model is configured to detect shapes or objects shown in the images, and can include at least one of You Only Look Once (YOLO), single-shot detector (SSD), Faster Region-based Convolutional Neural Network (Faster R-CNN), or any object detection model. The panel detection model is configured to segment and mask vehicle panels, and can include at least one of masked R-CNN, thresholding segmentation, edge-Based segmentation, region-based segmentation, watershed segmentation, clustering-based segmentation, or any image segmentation model. These models can be trained using any suitable machine learning algorithms, deep learning algorithms, neural networks, or artificial networks.

The service computing system 110 can host applications for users to download and install, enabling use of the trained models, e.g., for performing model inference that includes processes of running data into one or more corresponding machine learning algorithms to calculate outputs. The applications can run on any suitable computing devices. For example, a mobile application can be developed to install and run on a mobile device such as a mobile phone or tablet.

The mobile application can be obtained by converting deep-learning models that run on computers or servers to mobile compatible versions. For example, for mobile-edge deployment on iOS or Android platforms, the shape-detection model (e.g., YOLO) and/or the panel detection model (e.g., masked R-CNN) models can be converted to tf-lite versions. There are other platforms (e.g., PyTorch Mobile, MACE, Core-ML) that can convert the deep-learning models to mobile compatible versions.

The mobile compatible versions, e.g., tf-lite models, can be further subjected to quantization steps to reduce a model size without compromising on accuracies. In some embodiments, at least one of three types of quantization techniques is used in unison or separate depending on the dataset, including dynamic range quantization, full integer quantization, and float16 quantization. Dynamic range quantization quantizes weights from floating point to integer, which has 8-bits of precision. Full integer quantization provide reductions in peak memory usage by making sure all model math is integer quantized. Float16 quantization reduces the size of a floating-point model by quantizing the weights to float16.

The mobile device 120 can execute a mobile application integrating at least one of the deep-learning models. In some embodiments, the mobile device 120 includes at least one of a glare reduction module 124 configured to implement a glare reduction model, a shape detection module 125 configured to implement a shape detection model, or a panel detection module 126 configured to implement a panel detection model.

In some embodiments, the mobile device 120 can further include a report generation module 127. The mobile application can generate a damage assessment report (or a repair estimate report) using the report generation module 127 based on outputs from the models, e.g., shape data and panel data. In some embodiments, the damage assessment report includes counts of different shapes (or damage categories) per vehicle panel, as illustrated in FIG. 2D. In some embodiments, the damage assessment report can further include repair estimate costs, as illustrated in FIG. 2D.

In some embodiments, the mobile device 120 can generate the damage assessment report by processing the shape data and panel data with repair estimate data (or estimate cost data for damage repair). The repair estimate data can associate damages (different categories and different numbers), vehicle types, vehicle models, panel types, with corresponding estimated costs. The repair estimate data can be provided by a repair shop, an insurance company, a provider, or by an industry standard or rule. The repair estimate data can be stored in a database, e.g., in the databases 112, or in the memory 122 of the mobile device 120. The mobile device 120 can access the database external to the mobile device 120. In some embodiments, a repair estimate application can be developed based on the repair estimate data. In some embodiments, the mobile device 120 can integrate the mobile application (for model inference) and the repair estimate application to generate the damage assessment report (or the repair estimate report). In some embodiments, the service computing system 110 can also process panel data, shape data, and/or repair estimate data to generate a damage assessment report. The service computing system 110 can then provide the damage assessment report to the mobile device 120.

After the damage assessment report is generated either by the mobile device 120 or the service computing system 110, the mobile device 120 can transmit the damage assessment report to the computing device 108 for a representative of the vehicle repair shop to view, and/or to the computing device 106 for a representative of the insurance company to view. The computing device 106, 108 can be any type of devices, systems, or servers, e.g., a desktop computer, a mobile device, a smart mobile phone, a tablet computing device, a notebook, or a portable communication device.

FIGS. 2A-2D show an example process for assessing damages on a vehicle 210. The process can be performed at least partially by a mobile device, e.g., the mobile device 120 of FIG. 1, or by a service computing system, e.g., the service computing system 110 of FIG. 1, or a combination of the mobile device and the service computing system. The vehicle 210 can be the vehicle 130 of FIG. 1.

First, a user, e.g., a PDR technician, annotates or scribes shapes on one or more vehicle panels to detect damage areas (e.g., hail dents) under hail lights for the vehicle 210. Each shape is used to indicate at least one damage area present in at least one section of the vehicle 210. The shapes can be among a list of shape types that are detectable by a shape detection model, e.g., YOLO, SSD, Faster R-CNN, or any object detection model. The shapes can be also detected using at least one computer vision algorithm, e.g., Canny, Sobel, Laplacian and Prewitt edge detection, or Gaussian blur-thresholding based contour detection algorithms. The shape detection model can be pre-trained, e.g., by a machine learning algorithm or a neural network, to identify the list of shape types. In some examples, the shape types include solid dots, circles (or ellipses), and rectangles (or squares). The shape types can be recommended to the user for use. For example, a mobile application installed in the mobile device can instruct the user to use specific shape types, that are detectable by the shape detection model, for annotation or scribing. The specific shape types can be also selected based on the ease of scribing or drawing on vehicle panels.

Each shape can correspond to a respective damage category among a plurality of damage categories. In some examples, the damage categories can include small dents (like dime, nickel, or half dollar sized dents), over-sized dents, and prior damage or non-hail dents. Each shape is used to indicate the respective damage category for the damage area. Associations between shapes and damage categories can be predefined, e.g., in the mobile application, pre-known by the user, or determined by the user. For example, the mobile application can instruct the user to match different shape types to be used with corresponding damage categories. In some examples, solid dots are used to indicate small dents, circles (or ellipses) are used to indicate over-sized dents, and rectangles (or squares) are used to indicate prior damages or non-hail dents.

Figure 2A:
FIG. 2A is an example image showing shapes marking damage areas on a vehicle.

FIG. 2A is an example image 200 showing shapes (solid dots 212, circles 214, rectangles 216) marking damage areas on the vehicle 210. As noted above, after the user annotates or scribes the shapes on the vehicle 210, the user can use a camera or the mobile device to capture one or more images of the vehicle 210 that is annotated or scribed with the shapes. In some embodiments, as discussed with further details in FIGS. 3A-3F, the mobile device can install a mobile application that can be configured to instruct the user to take sectional images of panels of a vehicle. The mobile application can entail a set of pre-defined ground rules to help a user capture acceptable images for generating an accurate model prediction for creation of a damage assessment report. Each image can be an image of at least one section of the vehicle 210. The section can include one more vehicle panels, e.g., fender, front door, rear door, bedliner, rail, or wheel arch etc. The image may be a three-dimensional stereo image, monocular image, or any other appropriate image.

Images of the vehicle with scribed shapes can be ingested into a modeling framework for processing. As noted above, the modeling framework can include at least one of a glare reduction model, a shape detection model, or a panel detection model. In some embodiments, the mobile device transmits the images to a remote server, e.g., the service computing system 110 of FIG. 1, that includes the modeling framework. In some embodiments, the mobile device itself is implemented with the modeling framework configured to process the images itself. In some embodiments, the mobile device implements part of the modeling framework, and the remote server implements the other part of the modeling framework.

The images of the vehicle can be pre-processed to remove background features, remove noise, convert the images to greyscales, etc. The images can be pre-processed to generate a standard image, e.g., a binary image. The binary image may also have noise removed. In some embodiments, pre-processing can include converting the image using a generator neural network to generate a modified image, and the generator neural network can have been trained jointly with a discriminator neural network to generate modified images that have reduced image noise relative to input images to the generator neural network. In some embodiments, the images are pre-processed by using a Generative Adversarial Network (GAN). In a GAN, two neural networks are used in competition. A generator neural network receives an input image and generates an output image from the input image using learned parameters. The output image is then passed to a discriminator network to predict whether the output image has been generated by the generator neural network or is a real image.

In some embodiments, an image of the vehicle can be processed by a glare reduction model, before or after the pre-processing as noted above. The glare reduction model can be trained by a machine learning algorithm or a neural network to remove or reduce or minimize any glare or bright spots on images. Mask based techniques can be used to detect glares or bright spots. The techniques can include global binarization with Gaussian Blurr-Dilation-Erosion, in painting techniques, or CLAHE techniques.

The image of the vehicle, e.g., after being processed by the glare reduction model and/or the pre-processing, can be then input into a shape detection model. The shape detection model can include YOLO or any other object detection model like SSD, Faster-RCNN that can be modified to be applicable for shape detection. The shape detection model can be trained, e.g., using a machine learning algorithm or a neural network, to detect shapes precisely.

Figure 2B:
FIG. 2B is a processed version of the example image showing identified shapes on the vehicle of FIG. 2A using a shape detection model.

The shape detection model can generate a predicted shape bounding box for each shape from model prediction. FIG. 2B is a processed image 220 showing identified shapes on the vehicle 210 using the shape detection model. A shape bounding box 222 can be used to enclose the corresponding shape. Each shape bounding box 222 can be converted to actual image pixel coordinates that can be used to represent a position of a corresponding shape enclosed by the shape bounding box.

In some embodiments, different colors are used for the shape bounding boxes to indicate different shapes enclosed by the shape bounding boxes. In some embodiments, different labels 224, e.g., numbers 0, 1, 2, can be used to represent different shapes and/or associated damage categories. Each label 224 can be arranged adjacent to, e.g., on top of, the corresponding shape bounding box. As illustrated in FIG. 2B, bounding boxes 222 labelled with numbers 224, e.g., 0, 1 and 2, represent the detected shape types and associated classes, e.g., 0 for "Dots", 1 for "Circles," and 2 for "Rectangles." In some embodiments, colors and labels can be used together to represent detected shape types and associated classes.

The shape detection model can output shape data for the image. The shape data can include a plurality of identified shapes with associated shape bounding boxes and/or labels and/or position information. The shape data can also include a processed image, e.g., the image 220 shown in FIG. 2B.

In some embodiments, the shape data output from the shape detection model includes class or category information of identified (or predicted) shapes, image pixel coordinates of the bounding boxes of the identified shapes, and/or probability or confidence score indicating how confident the shape detection model is identifying or predicting a specific shape type. In some embodiments, the shape detection model identifies ae specific shape type for the shape when the probability score is larger than a threshold, e.g., 0.5. For example, Table 1 shows an example of shape data output from a shape detection model.

TABLE 1

Example shape data output from shape detection model

| Class | Shape Type | Normalized Shape x-center coordinate | Normalized Shape y-center coordinate | Normalized height | Normalized width | Probability Score |
|---|---|---|---|---|---|---|
| 0 | Dots | 0.167 | 0.460 | 0.011 | 0.012 | 0.750 |
| 0 | Dots | 0.598 | 0.527 | 0.010 | 0.014 | 0.650 |
| 0 | Dots | 0.648 | 0.596 | 0.005 | 0.006 | 0.640 |
| 0 | Dots | 0.483 | 0.591 | 0.019 | 0.024 | 0.590 |
| 1 | Circles | 0.242 | 0.443 | 0.019 | 0.018 | 0.533 |
| 1 | Circles | 0.592 | 0.525 | 0.019 | 0.018 | 0.647 |
| 1 | Circles | 0.482 | 0.602 | 0.021 | 0.018 | 0.699 |
| 2 | Rectangles | 0.365 | 0.395 | 0.009 | 0.013 | 0.700 |
| 2 | Rectangles | 0.365 | 0.395 | 0.009 | 0.013 | 0.700 |

The image of the vehicle, e.g., after being processed by the glare reduction model and/or the pre-processing and/or processed by the shape detection model, can be then input into a panel detection model. Model inference by the shape detection model and the panel detection model can be executed sequentially or in parallel.

The panel detection model is configured to segment vehicle panels in the image. The panel detection model can be trained to identify each vehicle panel. In some embodiments, the panel detection model can take the detected panel from the classification of the one or more panels and use information of the vehicle, e.g., the make, model and year of the vehicle, to determine the dimensions of the identified panel. The panel detection model can also mask identified panels as segments and isolate the masked segments associated with individual panels. The isolation of masked segments can be used to determine a shape-count of each category per panel. The masked segments can be also determined by using canny-edge-based contour detection techniques.

Figure 2C:
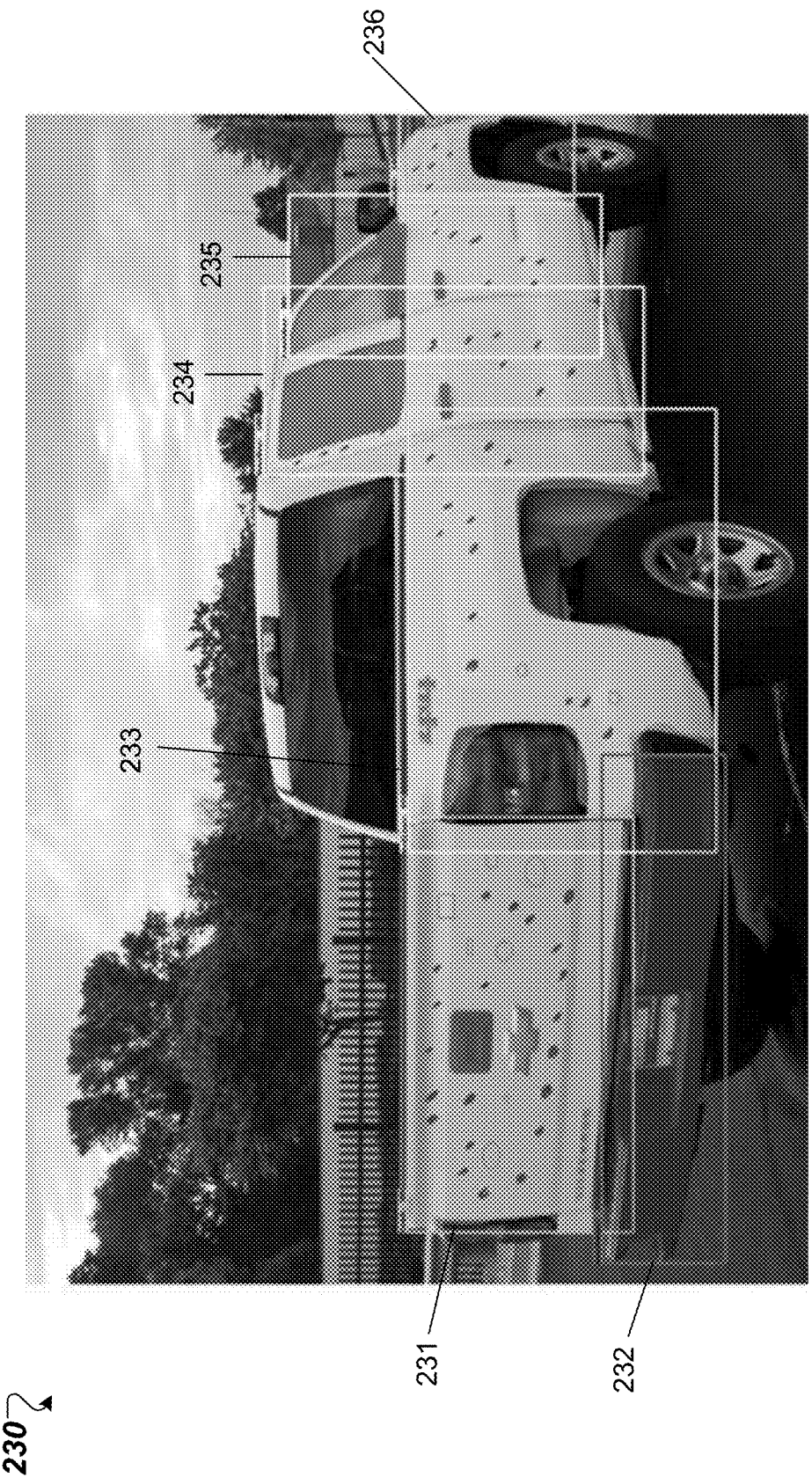
FIG. 2C is a processed version of the example image showing identified panels of the vehicle of FIG. 2A using a panel detection model.

FIG. 2C is an example processed image 230 showing identified panels of the vehicle 210 using the panel detection model. For example, different boxes 231-236 represent different masked segments for different panels in the image. Note that adjacent masked segments do not overlap with each other, such that same shapes are not counted twice.

The panel detection model can include masked R-CNN or any other image segmentation model. In some embodiments, the panel detection model provides a panel segmentation process that can be implemented by other machine vision techniques like: Thresholding Segmentation, Edge-Based Segmentation, Region-Based Segmentation, Watershed Segmentation, or Clustering-Based Segmentation Algorithms.

A masked R-CNN is a deep neural network. It can be made of a bottom-up pathway, a top-bottom pathway and lateral connections. The bottom-up pathway can be any convolutional neural network which extracts features from raw images e.g., residual neural network (ResNet), Visual Geometry Group (VGG), etc. The top-bottom pathway (e.g., forward pass) generates a feature map. The forward pass of the CNN results in feature maps at different layers, e.g., builds s multi-level representation at different scales. Top-down features can be propagated to high resolution feature maps thus having features across all levels. The Lateral connections are convolution and adding operations between two corresponding levels of the two pathways. The masked R-CNN proposes regions of interest in a feature map by using a selective search to generate region proposals for each image using a Region Prediction Network (RPN).

In some examples, the masked R-CNN uses a region of interest pooling layer to extract feature maps from each region of interest and performs classification and bounding box detection on the extracted feature maps. The pooling layer converts each variable size region of interest into a fixed size to be fed to a connected layer by performing segmentation and pooling, e.g., max-pooling. Bounding box regression is used to refine the bounding boxes such that class labels and bounding boxes are predicted. In other examples, the R-CNN uses a region of interest alignment layer. The region of interest alignment layer takes the proposed region of interest and dividing it into a specified number of equal size boxes and applying bilinear interpolation inside each box to compute the exact values of the input features at regularly sampled locations.

The masked R-CNN can further generate a segmentation mask. An intersection over union (IoU) is computed for each bounding box with a ground truth bounding box. Where the IoU of a bounding box with a ground truth bounding box is greater than a threshold level the bounding box is selected as a region of interest. The masked R-CNN can then further encode a binary mask per class for each region of interest. The masked R-CNN can be used to generate a respective classification of one or more sections of the vehicle. The masked R-CNN extracts a feature map from the image and executes a regression such that bounding boxes and class labels are extracted from the feature map and the generates a mask is generated that identifies the damaged section of the vehicle. More generally, however, any appropriate machine learning model can be used to perform the classification.

After processing the image of the vehicle, the panel detection model can output panel data. The panel data can include one or more panels identified in the image and information of individual panels. The information of a panel can include a position of the panel in the image, e.g., image pixel coordinates of the panel and/or a type (or class) of the panel such as front bumper, fender, front door, rear door, bedliner, rail, or wheel arch. The information of the panel can also include a probability score on how confident the panel detection model is identifying or predicting a specific panel type. The information of the panel can also include a detection mask coordinate matrix, e.g., made of 1 and 0, where 1 means that an associated detected panel is located there and 0 means that there is no object. The information of the panel can also include a corresponding bounding box that specifies a type of the panel.

Based on outputs of the models, e.g., the shape data from the shape detection model and the panel data from the panel detection model, a correlation between shapes identified in the image and panels identified in the image can be generated, e.g., by the mobile device or by the remote server. For example, the correlation can be generated by using a position of each shape (or a position of a corresponding shape-bounding box such as 222 of FIG. 2B) and a position of each panel (e.g., a position of a corresponding masked segment). For example, the correlation can be established based on coordinates of image pixels in the image, coordinates of identified shapes or shape-bounding boxes, and coordinates of masked regions for identified panels. In such a way, each shape can be correlated, e.g., precisely located, to a corresponding panel. In some embodiments, in the processed image, for each identified shape, a label for the corresponding or correlated panel (e.g., a panel type name or identifier) can be placed adjacent to (e.g., on top of) the identified shape. For each identified panel, a number of shapes for each damage category presented on the panel can be obtained.

In some embodiments, the shape identification model includes a shape identification algorithm that determines image pixel coordinates of shapes in the image. The panel detection model can include a panel identification algorithm that determines image pixel coordinates of boundaries (or borders) of a panel, and/or a group of coordinate values of pixels within the boundaries of the panel. The correlation can be performed by a panel-count algorithm configured to determine whether a shape is in a panel, e.g., by determining whether coordinates of the shape are within a range defined by the coordinates of the boundaries of the panel and/or whether the coordinates of the shape are within the group of coordinate values of pixels within the boundaries of the panel.

FIG. 2D shows an example 240 of a damage assessment report describing damage areas on vehicle panels. For example, for each panel, e.g., bedliner, fender, front door, rail, rear door, the number of shapes corresponding to different damage categories (e.g., circle, dot, rectangle) is counted. The report can also include a total number of damage areas (e.g., # dents) represented by different shapes. As shown in FIG. 2D, for Bedliner, the number of circles is 0, the number of dots is 11, and the number of rectangles is 2, thus the total number of dents is 13, a sum of the number of dots and the number of rectangles.

As noted above, the mobile device or the remote server can integrate estimate cost data (or repair estimate data) for damage repair, which can be implemented in a repair estimate application. The estimate cost data can be associated with at least one of damage categories (e.g., small dents or oversized dents), a number of damage areas in the same damage category, different panels (e.g., bedliner or fender), or vehicle models or model years. The damage assessment report can be generated based on the estimated cost data for damage repair. For example, as shown in FIG. 2D, the damage assessment report can include a repair cost for repairing detected dents on each panel, e.g., $2,500 for 13 dents on Bedliner, $1,250 for 7 dents on Fender, $3,700 for 14 dents on Front door, $1,800 for 9 dents on rail, and $6,250 for 27 dents on Rear door.

The user, e.g., the PDR technician, can use the mobile device to transmit the damage assessment report to a computing device of a repair shop (e.g., 108 of FIG. 1) or a computing device of a business entity such as an insurance company (e.g., 106 of FIG. 1). Using the damage assessment report, a representative of the repair shop can therefore determine whether it is cost effective to repair a panel or whether the panel should be replaced. A representative of the insurance company can determine whether to approve an insurance claim for repair.

FIGS. 3A-3G are screen shots of an example graphical user interface (GUI) of a mobile application installed on a mobile device. The mobile device can be the mobile device 120 of FIG. 1. The mobile device can be a portable data input device such as a tablet computer or a smart phone. The mobile application can be implemented by one or more modules deployed in the mobile device 120 of FIG. 1, e.g., the imaging module 123, the glare reduction module 124, the shape detection module 125, the panel detection module 126, the report generation module 127, and/or the communication module 128. A user, e.g., a PDR technician, can use the mobile application in the mobile device to perform damage assessment on vehicles, e.g., the vehicle 130 of FIG. 1.

The mobile application can entail a set of pre-defined ground rules to help users capture acceptable images for generating an accurate model prediction for creation of damage assessment report. For minimizing glares or bright spots and ensuring an acceptable image capture, the mobile application can apply one or more techniques including: Mask based Techniques to detect glares/bright spots, Global binarization with Gaussian Blurr-Dilation-Erosion, In painting techniques, and CLAHE techniques. The mobile application can also be configured to determine a region using canny-edge-based contour detection techniques.

The mobile application can instruct the user to capture images of scribed panels according to a predetermined order or sequence. For example, for an SUV, the user can be instructed to start capturing images of scribed panels in an order of left fender, left rear door, left quarter, trunk-rear bumper, right quarter, right rear door, right front door, right fender, hood, and roof.

In some cases, to capture a full coverage of a panel, the user can be instructed to split the panel into multiple sections and then capture images of the multiple sections. For example, to capture a full coverage on a roof, the user can be instructed to use a form of a delimiter or a physical line to split the roof into two sections and then to individually capture images of the two section. The mobile application can stitch the images before providing the panel image for model predictions.

Figure 3B:
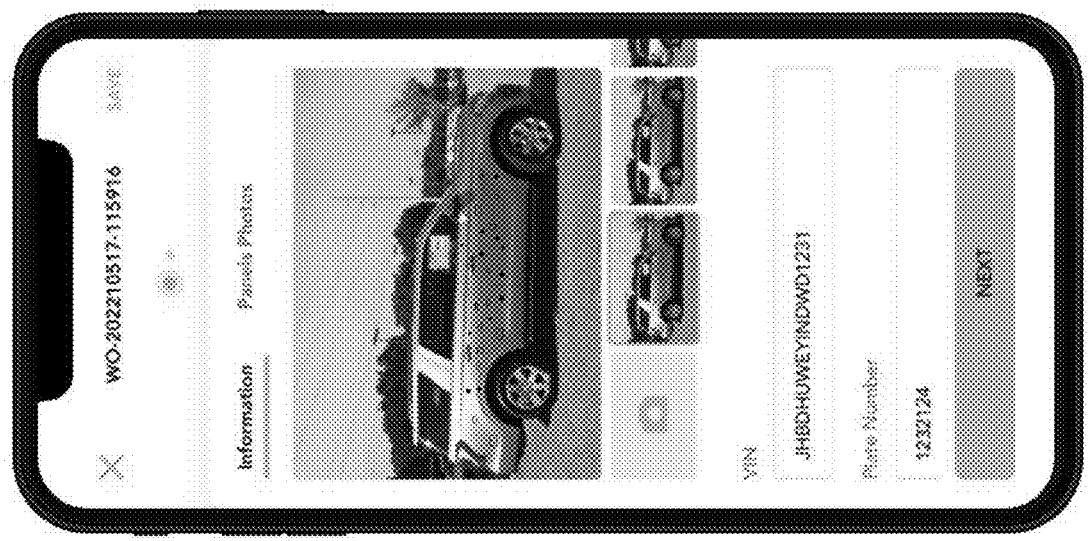
FIGS. 3A-3H are screen shots of example graphical user interfaces (GUIs) of a mobile application for assessing damages on vehicles.
Figure 3A:
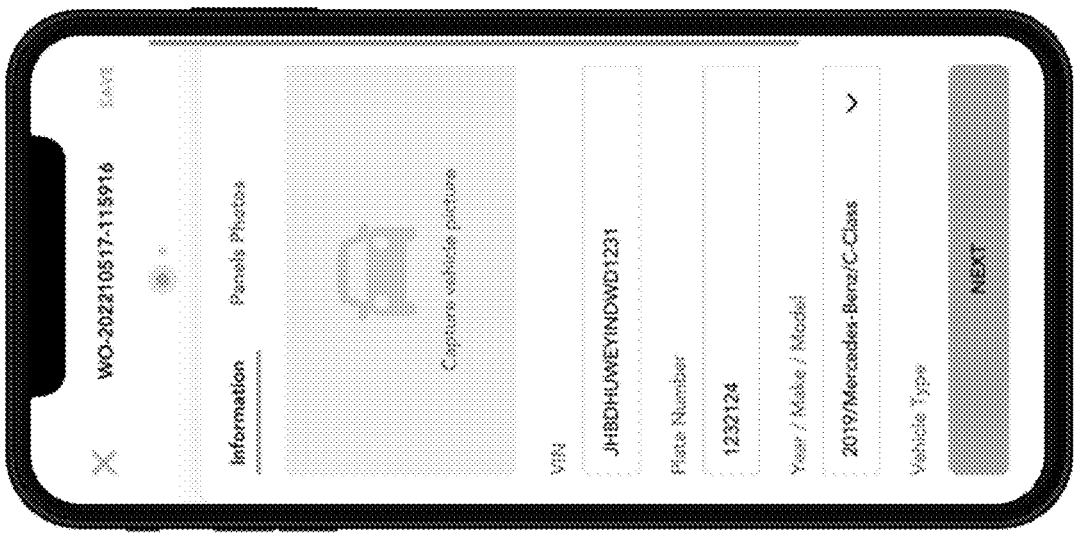

FIGS. 3A-3G show a workflow on the mobile application. First, as FIG. 3A shows, the GUI of the mobile application presents information for the user to enter, including VIN, plate number, Year/Make/Model, and vehicle type. In some embodiments, the mobile application can instruct the user to capture an image of a vehicle part including VIN, e.g., a bottom of the windshield or a side surface of the front door. Then, the mobile application can automatically obtain the information of VIN, Year/Make/Model, vehicle type, and/or plate number, e.g., by searching a vehicle database. The mobile application can then present the information in the GUI.

In some embodiments, as illustrated in FIG. 3A, the GUI includes a region instructing the user to capture an overview of a vehicle image of the vehicle, e.g., an image of one side of the vehicle. FIG. 3B shows the GUI presenting a captured vehicle image. In some embodiments, the mobile application can compare the captured vehicle image with a template image for the vehicle, e.g., an image of a vehicle having a same year/make/model/type, to confirm that the information of the vehicle in the GUI is correct.

The user can confirm the information presented in the GUI by clicking "SAVE" in the GUI, e.g., on the top right cover of the GUI. Then the user can click "NEXT" in the GUI to enter into next step to capture panel images. The mobile application can navigate the user to capture panel images in a pre-defined sequence, as noted above.

Figure 3D:
Figure 3C:
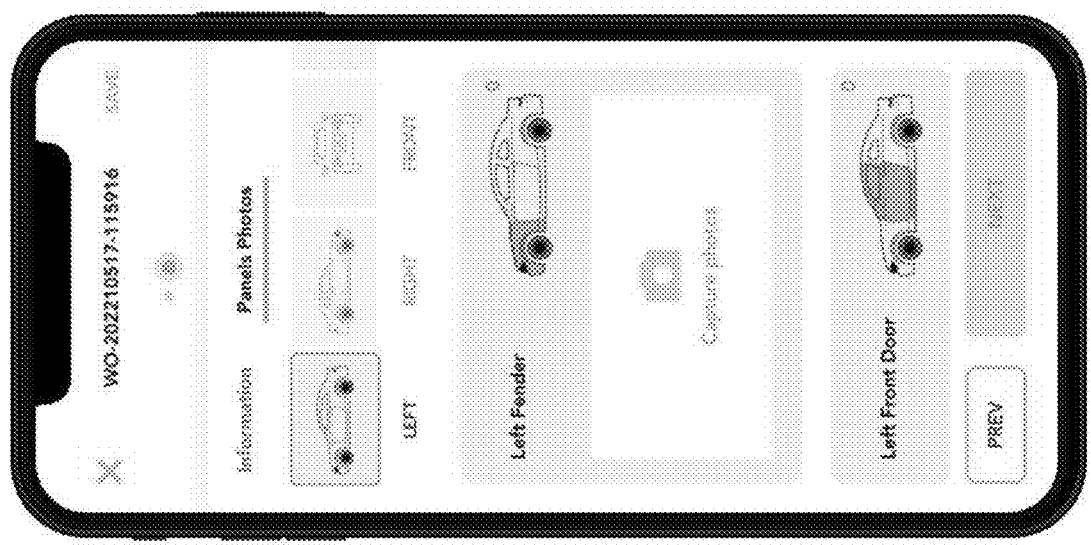

FIG. 3C shows the GUI showing a sequence for capturing panel images. Based on the information of the vehicle, the mobile application can obtain schematic diagrams of different sides of the vehicle, e.g., LEFT, RIGHT, FRONT, REAR, and TOP, to present in the pre-defined sequence. When a particular side is selected, a series of panels (e.g., Left Fender, Left Front Door) in the side are individually highlighted in respective diagrams presented in the GUI to indicate the user to capture corresponding images. For example, as illustrated in FIG. 3C, when LEFT side is selected, a diagram highlighting the Left Fender panel in the LEFT side of the vehicle in the GUI instructs the user to capture an image of the Left Fender panel. Sequentially and similarly, a diagram highlighting the Left Front Door panel in the LEFT side of vehicle in the GUI instructs the user to capture an image of the Left Front Door panel.

After the user captures an image of a designated panel, e.g., the Left Fender panel, the mobile application can prompt a GUI, as illustrated in FIG. 3D, presenting an image of the designated panel for the user to confirm. In some cases, the image the user captures may include an area larger than the designated panel. The mobile application can process, e.g., by cutting, the captured image to show only part of the captured image including the designated panel.

Figure 3F:
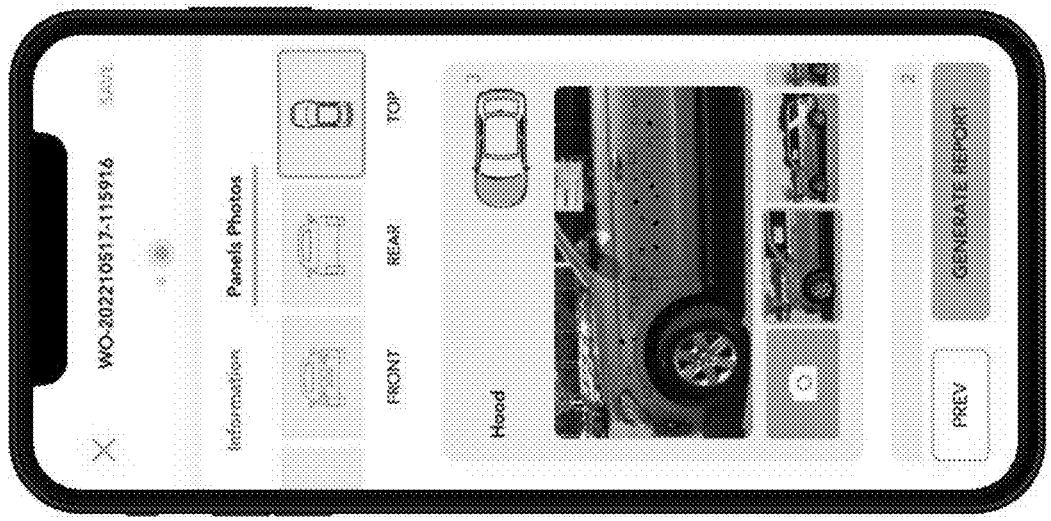
Figure 3E:
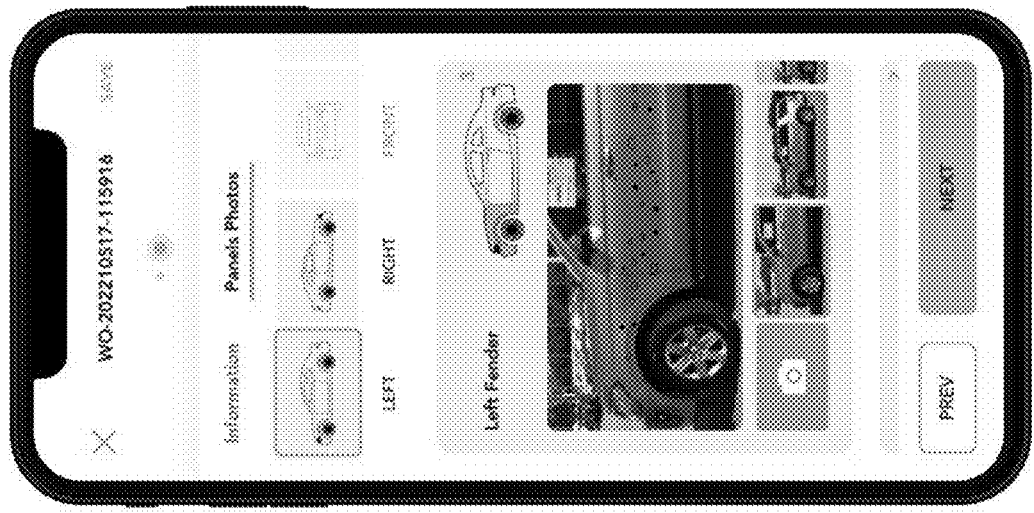
Figure 3H:
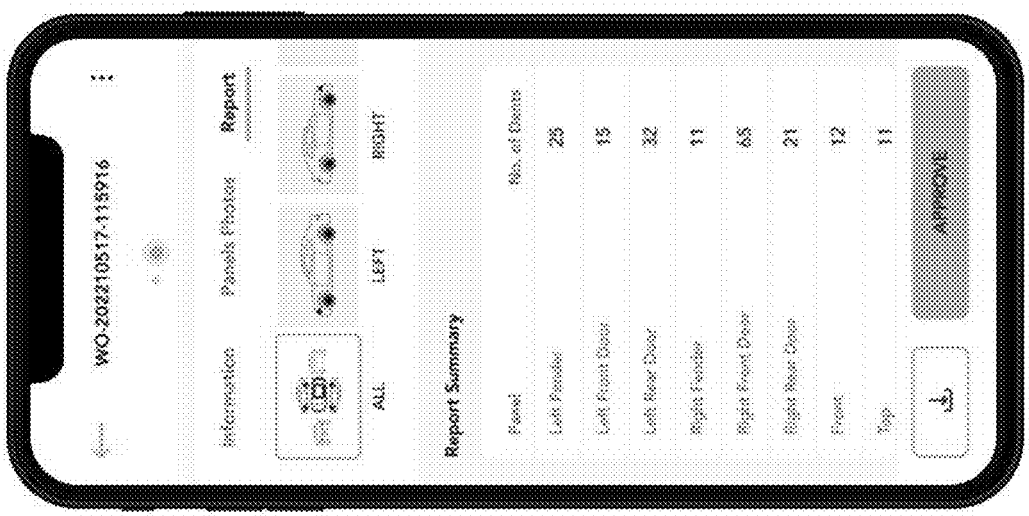

The mobile application can also presents "CONFIRM" and "RETAKE" in the GUI. If the user clicks "RETAKE" in the GUI, e.g., when the user is not satisfied with the shown image, the mobile application can return back to a previous GUI (e.g., as shown in FIG. 3C) for the user to retake an image of the designated panel. If the user clicks "CONFIRM," the image of the designated panel can be saved into the mobile application and the user can be guided to next step, e.g., to capture an image of a next panel. As illustrated in FIG. 3E, after the user confirms the image of the Left Fender, the mobile application presents the GUI including "NEXT" button for the user to proceed to the next step.

In some embodiments, to provide an acceptable image for accurate model inference, the mobile application can determine whether the captured image of the designated panel reaches an image criteria for the designated panel of the vehicle. For example, the mobile application can process the captured image of the designated panel to detect information of glare or bright spot on the designated panel of the vehicle, and determine whether the detected information of glare or bright spot is below a predetermined threshold. If the captured image fails to reach the image criteria, the mobile application can display an indication on the GUI for retaking the image of the designated panel. If the captured image reaches the image criteria, the mobile application can store the captured image for further processing.

In some embodiments, the mobile application can determine whether the captured image of the designated panel reaches the image criteria before presenting the captured image in the GUI for the user to confirm. If the captured image of the designated panel reaches the image criteria, the mobile application presents the captured image in the GUI for the user to confirm. If the captured image of the designated panel does not reach the image criteria, the mobile application can directly go back to the previous GUI to ask the user to retake the image of the designated panel.

In some embodiments, the mobile application can determine whether the captured image of the designated panel reaches the image criteria after presenting the captured image in the GUI for the user to confirm. After the user confirms the captured image, the mobile application determines whether the captured image of the designated panel reaches the image criteria.

Figure 3G:
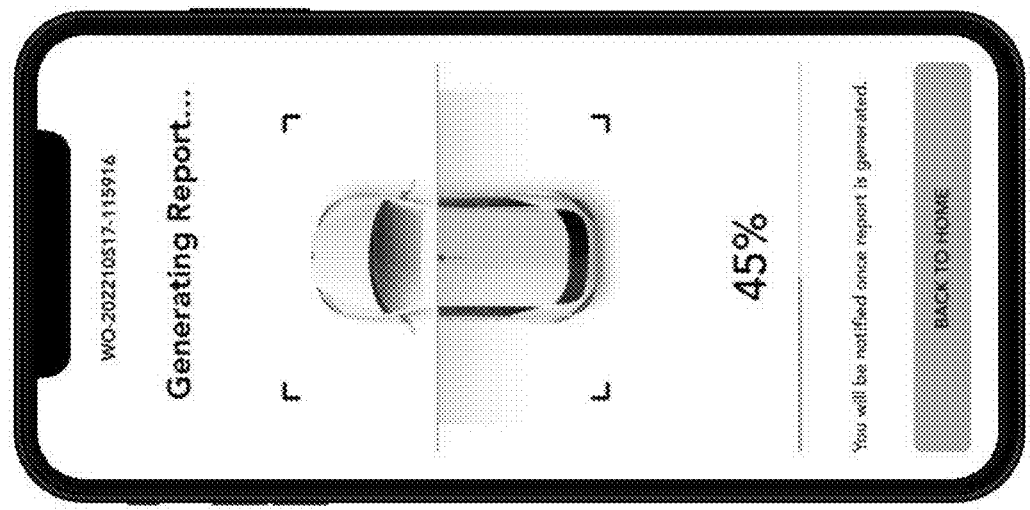

Once images of the sequence of panels are captured and stored into the mobile application, the user can proceed to a report generation phase. As illustrated in FIG. 3F, the mobile application presents the GUI including a bottom for "GENERATE REPORT." Once the user confirms the report generation, the images can be ingested into a model inference pipeline as described above. The model inference can include: i) a process of running an image into a glare reduction machine learning algorithm in a glare reduction model to calculate a processed image; ii) a process of running an image (e.g., the processed image) into a shape detection (or identification) algorithm in a shape detection model to output shape data; and/or iii) a process of running an image (e.g., the processed image) into a panel detection (or identification) algorithm in a panel detection model to output panel data. Then, data correlation can be performed by a panel-count algorithm to correlate shapes with panels based on the shape data and panel data. The model inference and the data correlation can take place on the mobile device and/or a cloud server (e.g., the server computing system 110 of FIG. 1). The mobile application can present the GUI to show a progress of report generation, as illustrated in FIG. 3G. The report can be a damage assessment report including a number of shapes present on each panel. The report can also include repair estimate for each panel.

Once the model inference and the data correlation are completed, the mobile application presents a report summary on the GUI showing a number of dents for each panel. In some embodiments, the mobile application can also present a report summary as shown in FIG. 2D, listing a number of dents of each damage category for each panel. The user can view the report summary for validation. After the user approves the report, the mobile application can save the report. The mobile device can then transmit the report to a repair shop or an insurance company, e.g., by the user.

In some embodiments, instead of capturing a sequence of images of vehicle panels, the mobile application can allow a user to take a video stream of the vehicle, e.g., by walking around the vehicle to sequentially capture different panels of the vehicle. The mobile application can process the video stream to obtain images of the different panels of the vehicle for further processing to assess damages on the vehicle, as described above.

Figure 4:
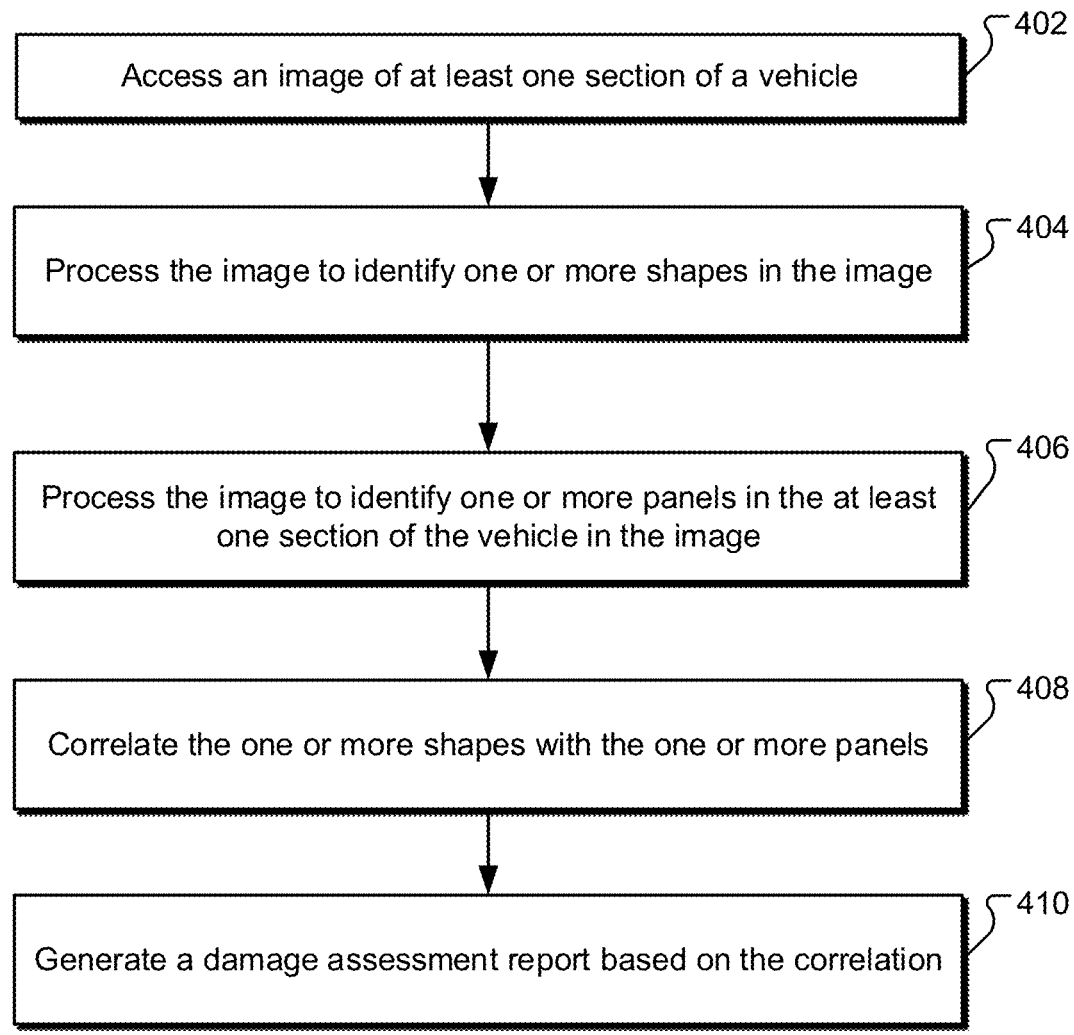
FIG. 4 is a flow chart of an example process for assessing damages on vehicles.

FIG. 4 is a flow chart of an example process 400 for assessing damages on vehicles. The process 400 can be performed by a mobile device (e.g., the mobile device 120 of FIG. 1), a remote server (e.g., the computing system 110 of FIG. 1), or a combination of the mobile device and the remote server.

At 402, an image of at least one section of a vehicle is accessed. The image shows a plurality of shapes that each have been applied to indicate at least one damage area present in the at least one section of the vehicle. A user, e.g., the PDR technician, can scribe or annotate the shapes on panels of the vehicle to detect damage areas on the vehicle, e.g., as illustrated in FIG. 2A. Each shape can at least partially cover a different corresponding damage area in the at least one section of the vehicle. The damage areas can include hail dents.

The plurality of shapes can have at least two different shape types, e.g., solid dots, circles (or ellipses), and rectangles (or squares). Each of the different shape types corresponds to a different damage category. For example, solid dots represent small dents, circles represents oversized dents, and rectangles represent previous damages or non-hail damages. The user can be recommend to use the shapes to indicate different damage areas. The user can be instructed, e.g., by a mobile application installed on the mobile device, to capture images of vehicle panels, e.g., as illustrated in FIGS. 3A to 3F.

In some embodiments, the process 400 is performed on the remote server. The remote server can receive the image from the mobile device that captures the image. In some embodiments, the image can be generated based on at least one frame of a video stream for the at least one section of the vehicle.

In some embodiments, the image can be an output of a glare reduction model and/or a result of pre-processing. The pre-processing can include removing background features, removing noise, converting the image to greyscales, etc. The glare reduction model can be trained through a machine learning algorithm to reduce surface glare of the vehicle in the image.

In some embodiments, the image is generated based on multiple sectional images of the vehicle, each of the multiple sectional images being associated with a different corresponding section of the vehicle. For example, a roof can be divided into two sections, and each section is captured in a separate image. Then the separate images of the two sections can be combined to get an image of roof.

In some embodiments, an instruction can be displayed on a display of the mobile device for capturing a sectional image of a section of the vehicle, e.g., as illustrated in FIG. 3C. In some embodiments, in response to obtaining a captured sectional image of the section of the vehicle, the process 400 can include determining whether the captured sectional image reaches an image criteria for the section of the vehicle.

In some embodiments, the captured sectional image is processed to detect information of glare or bright spot on the section of the vehicle, and then the mobile device can determine whether the detected information of glare or bright spot is below a predetermined threshold.

In response to determining that the captured sectional image fails to reach the image criteria for the section of the vehicle, the mobile device can display an indication on the display for retaking the sectional image of the section of the vehicle. In response to determining that the captured sectional image reaches the image criteria for the section of the vehicle, the mobile device can store the captured sectional image for further processing.

At 404, the image is processed to identify one or more shapes in the image. The image can be provided as input to a first model that has been trained, through a first machine learning algorithm, to identify the plurality of shapes in the image and, in response, shape data is generated by the first model. The shape data can describe a position of each of one or more shapes identified in the image. The shape data can include a corresponding shape type for each of the one or more shapes identified in the image.

In some embodiments, the first model can be a shape detection model that includes at least one of: You Only Look Once (YOLO), single-shot detector (SSD), Faster Region-based Convolutional Network (Faster R-CNN), or any suitable object detection model. The first model can be pre-trained to accurately identify different types of shapes.

In some embodiments, the shape data includes: for each of the one or more shapes, a corresponding label (e.g., number 0, 1, 2 as shown in FIG. 2B) for the corresponding shape type of the shape. The process 400 can further include: for each of the one or more panels, counting, based on the corresponding labels, a number of identified shapes that are correlated with the panel and have a same corresponding shape type.

In some embodiments, the first model is trained to process the image to enclose a corresponding bounding box for each of the one or more shapes identified in the image (e.g., as illustrated in FIG. 2B) and to determine the position of the shape based on a position of the corresponding bounding box.

At 406, the image is processed to identify one or more panels in the at least one section of the vehicle in the image. The image can be provided as input to a second model that has been trained, through a second machine learning algorithm, to identify the one or more panels of the vehicle that are present in the at least one section shown in the image, and in response, panel data is generated by the second model. The panel data can describe a position of each of the one or more panels identified in the image.

The second model can include at least one of: masked R-CNN, thresholding segmentation, edge-Based segmentation, region-based segmentation, watershed segmentation, clustering-based segmentation, or any image segmentation algorithm.

In some embodiments, the second model is trained to process the image to segment the at least one section of the vehicle into the one or more panels by masking one or more segments of the image, and isolating the masked one or more segments of the image as the one or more panels, each of the masked one or more segments being associated with a corresponding one of the one or more panels.

At 408, the one or more shapes and the one or more panels are correlated, e.g., automatically, based on the shape data and the panel data to determine, for each of the one or more panels of the vehicle, a number of shapes that are present on the panel.

In some embodiments, each of the one or more shapes can be correlated with a respective panel of the one or more panels based on the position of the shape and the position of the respective panel. In some embodiments, each of the one or more shapes can be correlated with a respective panel of the one or more panels based on the position of the shape and a masked segment associated with the respective panel.

In some embodiments, for each of the one or more panels, the process 400 can further include: classifying one or more identified shapes correlated with the panel according to one or more corresponding shape types for the one or more identified shapes, and for each of the one or more corresponding shape types, counting a respective number of identified shapes that are correlated with the panel and have a same corresponding shape type.

At 410, a damage assessment report is generated, which describes, for each of the one or more panels of the vehicle, the number of shapes that are present on the panel. The process 400 can include: generating shape-damage correlation data based on the one or more panels, the one or more corresponding shape types for each of the one or more panels, and the respective number for each of the one or more corresponding shape types.

In some embodiments, estimate cost data for damage repair is accessed. The estimated cost data is associated with at least one of damage categories, a number of damage areas in a same damage category, different panels, or vehicle models. The damage assessment report can be generated based on the shape-damage correlation data and the estimated cost data for damage repair.

In some embodiments, after the damage assessment report is generated, the damage assessment report can be provided, e.g., by transmitted through a network such as the network 104 of FIG. 1, to at least one of a repair shop representative or a vehicle insurance company representative.

In some embodiments, the mobile device can install a mobile application integrating one or more models including a glare reduction model, a shape detection model, and a panel detection model.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method for assessing damages on a vehicle, the computer-implemented method comprising:
 accessing an image of at least one section of the vehicle, the image showing a plurality of shapes that each have been applied to indicate at least one damage area present in the at least one section of the vehicle;
 providing the image as input to a first model that has been trained, through a first machine learning algorithm, to identify the plurality of shapes in the image and, in response, obtaining shape data that is generated by the first model, the shape data describing a position of each of one or more shapes identified in the image;
 providing the image as input to a second model that has been trained, through a second machine learning algorithm, to identify one or more panels of the vehicle that are present in the at least one section shown in the image, and in response, obtaining panel data that is generated by the second model, the panel data describing a position of each of the one or more panels identified in the image;
 automatically correlating the one or more shapes and the one or more panels based on the shape data with the panel data to determine, for each of the one or more panels of the vehicle, a number of shapes that are present on the panel; and
 generating a damage assessment report that describes, for each of the one or more panels of the vehicle, the number of shapes that are present on the panel.

2. The computer-implemented method of claim 1, wherein the first model comprises at least one of:
 You Only Look Once (YOLO), single-shot detector (SSD), Faster Region-based Convolutional Neural Network (Faster R-CNN), or a computer vision algorithm.

3. The computer-implemented method of claim 1, wherein the plurality of shapes have at least two different shape types, each of the different shape types corresponding to a different damage category, and
 wherein the shape data comprises a corresponding shape type for each of the one or more shapes identified in the image.

4. The computer-implemented method of claim 3, comprising:
 for each of the one or more panels,
  classifying one or more identified shapes correlated with the panel according to one or more corresponding shape types for the one or more identified shapes; and
  for each of the one or more corresponding shape types, counting a respective number of identified shapes that are correlated with the panel and have a same corresponding shape type.

5. The computer-implemented method of claim 4, wherein generating the damage assessment report comprises:
 generating shape-damage correlation data based on the one or more panels, the one or more corresponding shape types for each of the one or more panels, and the respective number for each of the one or more corresponding shape types.

6. The computer-implemented method of claim 5, wherein generating the damage assessment report comprises:
 accessing estimate cost data for damage repair that is associated with at least one of damage categories, a number of damage areas in a same damage category, different panels, or vehicle models; and
 generating the damage assessment report based on the shape-damage correlation data and the estimated cost data for damage repair.

7. The computer-implemented method of claim 6, comprising:
 providing the damage assessment report to at least one of a repair shop representative or a vehicle insurance company representative.

8. The computer-implemented method of claim 3, wherein the shape data comprises: for each of the one or more shapes, a corresponding label for the corresponding shape type of the shape, and
 wherein the computer-implemented method comprises:
  for each of the one or more panels, counting, based on the corresponding labels, a number of identified shapes that are correlated with the panel and have a same corresponding shape type.

9. The computer-implemented method of claim 1, wherein the first model is trained to process the image to enclose a corresponding bounding box for each of the one or more shapes identified in the image and to determine the position of the shape based on a position of the corresponding bounding box, and
 wherein automatically correlating the one or more shapes and the one or more panels based on the shape data with the panel data comprises:
  correlating each of the one or more shapes with a respective panel of the one or more panels based on the position of the shape and the position of the respective panel.

10. The computer-implemented method of claim 1, wherein the second model is trained to process the image to segment the at least one section of the vehicle into the one or more panels by
 masking one or more segments of the image, and
 isolating the masked one or more segments of the image as the one or more panels, each of the masked one or more segments being associated with a corresponding one of the one or more panels.

11. The computer-implemented method of claim 10, wherein automatically correlating the one or more shapes and the one or more panels based on the shape data with the panel data comprises:
 correlating each of the one or more shapes with a respective panel of the one or more panels based on the position of the shape and a masked segment associated with the respective panel.

12. The computer-implemented method of claim 1, wherein the second model comprises at least one of:
 masked R-CNN, thresholding segmentation, edge-Based segmentation, region-based segmentation, watershed segmentation, or clustering-based segmentation.

13. The computer-implemented method of claim 1, comprising:
 receiving the image from a remote communication device configured to capture images of the vehicle.

14. The computer-implemented method of claim 1, comprising:
 providing an initial image as input to a third model that has been trained, through a third machine learning algorithm, to reduce surface glare of the vehicle in the image and, in response, obtaining the image that is generated by the third model.

15. The computer-implemented method of claim 1, comprising:

generating the image based on multiple sectional images of the vehicle, each of the multiple sectional images being associated with a different corresponding section of the vehicle.

16. The computer-implemented method of claim 1, comprising:

generating the image based on at least one frame of a video stream for the at least one section of the vehicle.

17. The computer-implemented method of claim 1, comprising:

displaying an instruction on a display for capturing a sectional image of a section of the vehicle; and in response to obtaining a captured sectional image of the section of the vehicle, determining whether the captured sectional image reaches an image criteria for the section of the vehicle.

18. The computer-implemented method of claim 17, wherein determining whether the captured sectional image reaches the image criteria for the section of the vehicle comprises:

processing the captured sectional image to detect information of glare or bright spot on the section of the vehicle; and determining whether the detected information of glare or bright spot is below a predetermined threshold.

19. The computer-implemented method of claim 17, comprising one of:

in response to determining that the captured sectional image fails to reach the image criteria for the section of the vehicle, displaying an indication on the display for retaking the sectional image of the section of the vehicle, or in response to determining that the captured sectional image reaches the image criteria for the section of the vehicle, storing the captured sectional image for further processing.

20. The computer-implemented method of claim 17, comprising:

displaying a highlighted view of a representation of the section of the vehicle on the display.

21. The computer-implemented method of claim 20, comprising:

displaying the representation of the section of the vehicle based on information of the vehicle.

22. The computer-implemented method of claim 1, wherein the plurality of shapes are marked on the vehicle by a user, and wherein each of the plurality of shapes at least partially covers a different corresponding damage area in the at least one section of the vehicle.

23. The computer-implemented method of claim 1, comprising:

processing the image by at least one of a glare reduction model, a shape detection model, or a panel detection model that is integrated in a mobile device.

24. An apparatus comprising:
at least one processor; and
one or more memories coupled to the at least one processor and storing programming instructions for execution by the at least one processor to perform operations comprising:

accessing an image of at least one section of a vehicle, the image showing a plurality of shapes that each have been applied to indicate at least one damage area present in the at least one section of the vehicle;

providing the image as input to a first model that has been trained, through a first machine learning algorithm, to identify the plurality of shapes in the image and, in response, obtaining shape data that is generated by the first model, the shape data describing a position of each of one or more shapes identified in the image;

providing the image as input to a second model that has been trained, through a second machine learning algorithm, to identify one or more panels of the vehicle that are present in the at least one section shown in the image, and in response, obtaining panel data that is generated by the second model, the panel data describing a position of each of the one or more panels identified in the image;

automatically correlating the one or more shapes and the one or more panels based on the shape data with the panel data to determine, for each of the one or more panels of the vehicle, a number of shapes that are present on the panel; and generating a damage assessment report that describes, for each of the one or more panels of the vehicle, the number of shapes that are present on the panel.

25. A non-transitory computer readable storage medium coupled to at least one processor and having machine-executable instructions stored thereon that, when executed by the at least one processor, cause the at least one processor to perform operations comprising:

accessing an image of at least one section of a vehicle, the image showing a plurality of shapes that each have been applied to indicate at least one damage area present in the at least one section of the vehicle;

providing the image as input to a first model that has been trained, through a first machine learning algorithm, to identify the plurality of shapes in the image and, in response, obtaining shape data that is generated by the first model, the shape data describing a position of each of one or more shapes identified in the image;

providing the image as input to a second model that has been trained, through a second machine learning algorithm, to identify one or more panels of the vehicle that are present in the at least one section shown in the image, and in response, obtaining panel data that is generated by the second model, the panel data describing a position of each of the one or more panels identified in the image;

automatically correlating the one or more shapes and the one or more panels based on the shape data and the panel data to determine, for each of the one or more panels of the vehicle, a number of shapes that are present on the panel; and generating a damage assessment report that describes, for each of the one or more panels of the vehicle, the number of shapes that are present on the panel.

* * * * *